June 26, 1934.    R. B. MARR    1,964,384
COMPOSITE ARTICLE AND METHOD OF MAKING Filed Jan. 8, 1932

INVENTOR
ROBERT B. MARR
BY
ATTORNEY

Patented June 26, 1934

1,964,384

UNITED STATES PATENT OFFICE 1,964,384

COMPOSITE ARTICLE AND METHOD OF MAKING

Robert Bruce Marr, Montreal West, Quebec, Canada, assignor to The Goodyear's India Rubber Glove Mfg. Company, Naugatuck, Conn., a corporation of Connecticut Application January 8, 1932, Serial No. 585,546

2 Claims. (Cl. 18—59)

This invention relates to a method of uniting vulcanized rubber to fibrous material, more particularly to leather, and to the composite article produced thereby.

Great difficulty has been had in securing reliable joints between vulcanized rubber and fibrous material, more particularly leather. When these materials are united by ordinary rubber cements, particularly in the case of vulcanized rubber soles which have been highly compounded to secure good wear, the adjoining surfaces have such different characteristics that it is practically impossible to secure a proper union by the use of cement alone.

It has also been proposed to insert a sheet of unvulcanized rubber between the fibrous material and the vulcanized rubber and to unite this intermediate sheet by cement to the outer layers. However, since the intermediate sheet is of unvulcanized rubber, it amounts in substance merely to thickening the layer of cement between the two layers to be united. Moreover, when an interposed sheet of unvulcanized rubber is used, there is a tendency for it to squeeze out at the edges when under pressure, particularly if the temperature is fairly high. A further difficulty is that when this method is used, there is a tendency for the vulcanized rubber sheet to slip sideways or shift.

An object of my invention is to provide an improved method for attaching vulcanized rubber to fibrous material, such as leather. Another object is to provide an improved method for attaching shoe soles of a relatively stiff and highly compounded vulcanized rubber composition to leather shoes or leather inner soles. A still further object is to provide an improved composite article of fibrous material and vulcanized rubber.

The invention broadly comprises interposing a layer of semi-cured rubber between a layer of fibrous material, such as leather, and a layer of vulcanized rubber, and uniting the semi-cured rubber to the adjoining parts by unvulcanized rubber deposited from cement.

For a complete understanding of the nature and objects of the invention, reference is made to the attached specification and drawing, in which latter:

Figure 1:
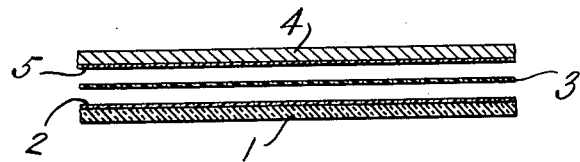
Figure 1 is a sectional view showing the parts to be united.
Figure 2:
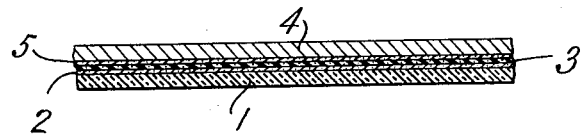
Fig. 2 is a sectional view showing the completed article.

As a specific embodiment of the invention, there will first be described a method for uniting vulcanized rubber soles to a leather shoe or to a leather inner sole of a shoe.

In carrying out the process, the side of the vulcanized rubber sole 1, which is to be attached to the leather, is first cleaned and buffed to roughen its surface, after which a coat of rubber cement 2 is brushed or otherwise applied to the buffed surface and allowed to dry for a short time, say 15 minutes. Upon the cemented surface is then placed a thin sheet 3 of semi-cured rubber, which latter is of the pure gum type and may vary in thickness from about .005 to .040 of an inch. The thin sheet of semi-cured rubber is then hammered down or otherwise firmly united with the sole by pressure.

The leather sole 4 or other surface of the shoe to which the sole is to be united is also roughened up, given a coat 5 of cement, and dried. The combined rubber sole and semi-cured rubber top piece are then placed on the shoe with the free surface of the semi-cured sheet in contact with the cemented portion of the leather and the entire combination then hammered down or otherwise firmly united by pressure.

In the same way, other leather articles, or other sheets of fibrous material may be united to vulcanized sheets of rubber by means of a thin semi-cured sheet of rubber and cement.

The invention provides a quick, cheap and strong method for uniting rubber soles to leather footwear, and it is particularly applicable to cementing on relatively stiff vulcanized rubber soles which have been heavily compounded to provide increased abrasion resistance. It is practically impossible to unite such soles firmly to leather by means of cement alone. The method provides for attaching a sole over the whole surface and not just at the edges as when the sole is stitched in place, and when worn thin the soles will not balloon out. A further advantage is that the leather sole to which the rubber sole is attached remains in good condition since neither nails nor stitches have been used. A still further advantage is that, when the intermediate sheet of semi-cured rubber is used, it does not squeeze out or flatten out at the edges when under pressure, nor does the rubber sole have any tendency to slip or shift sideways, as is the case when an unvulcanized sheet is used. The soft semi-cured sheet also fills in any small irregularities in the surfaces of the leather and the sole which are to be united, thereby increasing the strength of the bond.

By reason of the fact that the intermediate sheet is only semi-cured, the solvent of the cement which is applied to the leather and to the vulcanized sole can soften the surfaces of the semi-cured sheet thus enabling the cement on each side of the sheet to enter into it to some extent, while due to the roughening of the sole and the leather, the cement also enters these elements to a certain extent. There is thus provided a very strong bond. If desired, a layer of cement may also be supplied to the semi-cured sheet before uniting it to either the sole or the leather.

Having thus described my invention, what I claim and desire to protect by Letters Patent is:

1. A method of attaching vulcanized rubber to fibrous material which comprises disposing a layer of semi-cured rubber between the two and uniting it to them by a rubber-like cement.

2. A composite article comprising a layer of fibrous material, a layer of vulcanized rubber, and an intermediate layer of semi-cured rubber bonded to said first named layers by unvulcanized rubber.

ROBERT BRUCE MARR.